Oct. 4, 1966 J. C. McADAM ETAL 3,277,346

COOLER PACKAGE FOR ELECTRONIC COMPONENTS

Filed Aug. 29, 1962 2 Sheets-Sheet 1

INVENTORS
JOHN C. McADAM
JOHN E. SPURLING

By: Beehler & Shanahan

ATTORNEYS

Oct. 4, 1966 J. C. McADAM ETAL 3,277,346

COOLER PACKAGE FOR ELECTRONIC COMPONENTS

Filed Aug. 29, 1962 2 Sheets-Sheet 2

INVENTORS
JOHN C. McADAM
JOHN E. SPURLING
By: Beehler & Shanahan
ATTORNEYS

United States Patent Office 3,277,346

Patented Oct. 4, 1966

3,277,346

COOLER PACKAGE FOR ELECTRONIC COMPONENTS

John C. McAdam, Burbank, and John E. Spurling, Encino, Calif., assignors, by mesne assignments, to International Electronic Research Corporation, a corporation of California Filed Aug. 29, 1962, Ser. No. 220,261
12 Claims. (Cl. 317—100)

The invention relates to heat dissipation devices for electronic components and in particular components of the nature of transistors and tubes. The invention actually concerns a package containing a relatively large number of coolers for transistors, tubes, and similar components where the heat dissipating units are grouped together in a package so that there is a greater cooling effect in the package arrangement than if a corresponding number of units were employed individually without being grouped together.

In recent years there has been considerable development in producing transistor coolers and similar devices of various configurations in the interest of improving where possible the amount of heat dissipation and the dependability of the cooling effect. In order to keep the price of such coolers within merchandising limits, forms of cooler devices have been resorted to which have been largely an adaptation of commercial extrusions and configurations, most of which have been designed particularly for the purpose to which they have been diverted. Even though coolers of this character have been grouped together to a degree to make a cooling package, the cooling package in those instances has been little more than the aggregate of the cooling effect of the individual units with all of the limitations inherent in the individual units. It is further true that the packaging, where that term might reasonably be applied, has not been without many limitations and those packaging systems have been cumbersome, expensive and of low efficiency.

It is therefore among the objects of the invention to provide a new and improved cooler package for electronic components wherein a relatively large number of individual coolers are grouped together in a special fashion so as to improve the dissipation of heat not only by having the package in a form to take advantage of circulation of air over the entire package but also to improve the dissipation by radiation and conduction from the package as a unit.

Another object of the invention is to provide a new and improved cooler package for electronic components which so arranges the heat dissipating elements of the individual components that the elements of one unit will not be at a location to receive and absorb heat radiated from elements of other units, thereby to minimize to a substantial extent necessary radiation.

Another object of the invention is to provide a new and improved cooler package for electronic components wherein a multiple number of individual units are grouped in a three-dimensional attitude with heat dissipating elements accumulated in the path of flow of cooling air or other gas and furthermore so disposed in the path as to promote a desired degree of turbulence, thereby to greatly augment the cooling effect.

Another object of the invention is to provide a new and improved cooler package for electronic components in the form of a three-dimensional stack made up of modules, each module in turn containing a multiple number of cooling units arranged peripherally around the module so that whether the module be used alone or in companying with others, a particularly adequate flow path will be provided along which cooling air may be circulated by means of a fan.

Still another object of the invention is to provide a new and improved cooler unit of such construction that even though usable alone for mounting a single transistor or other electronic component, the unit is of such special construction that it can be used with others of the same configuration to actually construct the housing of a package wherein the units perform a double function, namely, that of cooling and that of providing the structure of the package itself.

Still another object of the invention is to provide a new and improved cooler package for electronic components wherein individual units each comprising a cooler can be grouped as modules and with modules used together with other modules in a form such that the leads from the components can be very conveniently directed to paths which greatly improved the ease of wiring the components in the assembly, the assembly further being of such nature that units if need be can be insulated from each other and further so that modules comprising groups of units can also be insulated from other modules while still maintaining a neat, convenient and compact package which is highly advantageous not only when depending upon natural convection currents for cooling but also when depending upon a forced air flow from one or more fans.

With these and other objects in view, the invention consists in the construction, arrangement and combination of the various parts of the device, whereby the objects contemplated are attained, as hereinafter set forth, pointed out in the appended claims and illustrated in the accompanying drawings.

Figure 1:
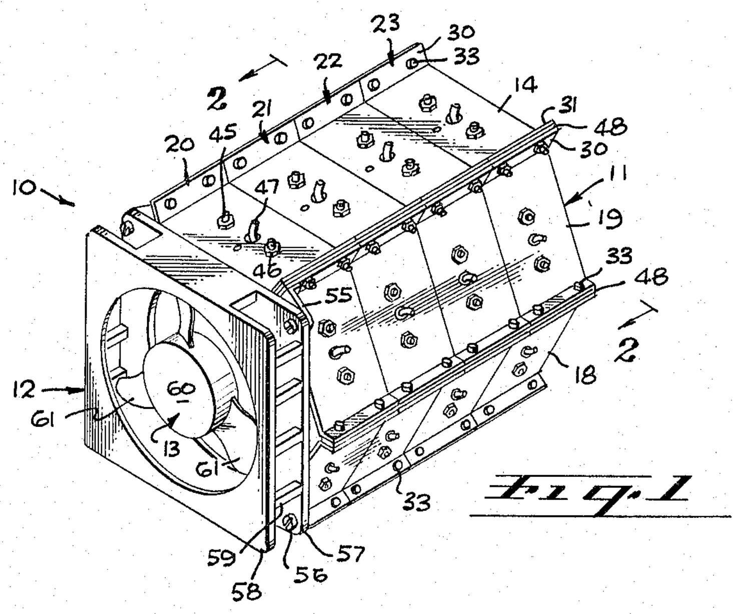
FIGURE 1 is a side perspective view of a color package showing one form of the invention.
Figure 2:
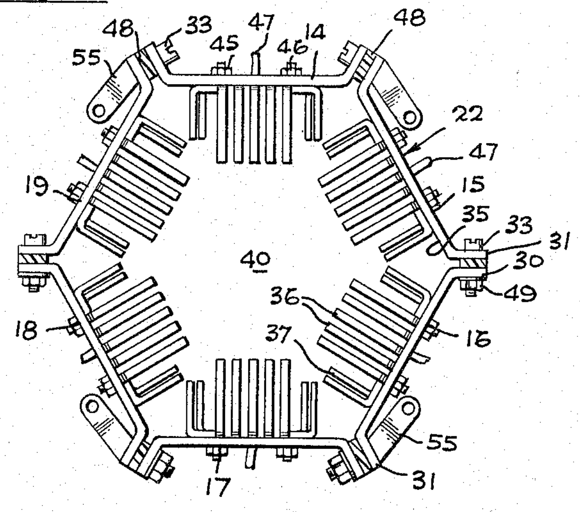
FIGURE 2 is an end elevational view taken on the line 2—2 of FIGURE 1.

In an embodiment of the invention here chosen as illustrative of the principles involved there is shown a cooler package indicated generally by the reference character 10 consisting in the main of a cooler housing 11 and a fan housing 12, the latter including a fan 13. As revealed advantageously in FIGURE 2, the housing has a polygonal cross-sectional shape which in the chosen embodiment is in the form of a heaxgon having six sides 14, 15, 16, 17, 18 and 19. In practice the housing may be made of a number of modules depending upon size requirements and capacity. In the embodiment shown there are four identical modules indicated generally by the reference charcters 20, 21, 22 and 23, all identical in size, shape, configuration and composition, in the interest of simplicity and uniformity. Actually the module 22 is shown in FIGURE 2 but the showing would be the same for any one of the other three modules.

Figure 3:
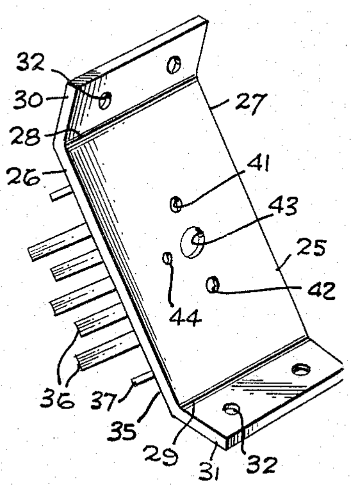
FIGURE 3 is a rear perspective view of one of the units which make up the package.

It is of special interest to note that each of the modules in turn is constructed of six separate cooler units each identical with respect to every other unit, the units for example, having the shape, size and configuration of that illustrated in FIGURE 3. As there shown the unit consists of a base plate 25 having a pair of opposite parallel side edges 26 and 27 and a pair of opposite parallel end edges 28 and 29. The end edges may comprise flanges 30 and 31, respectively, for the end edges 28 and 29. The end edges are bent at an angle of sixty degrees with respect to the base plate 25 where a hexagonal housing is to be employed. In the event that the housing might be of some other polygonal shape as, for example, a triangle, the flange would be bent to an angle of thirty degrees. Similarly, if a polygonal cross-sectional square shape were employed, the angular relationship would be forty-five degrees, this being on the assumption that each and every unit is to be made identical. Holes 32 are provided for reception of mounting screws 33.

Figures 4, 6:
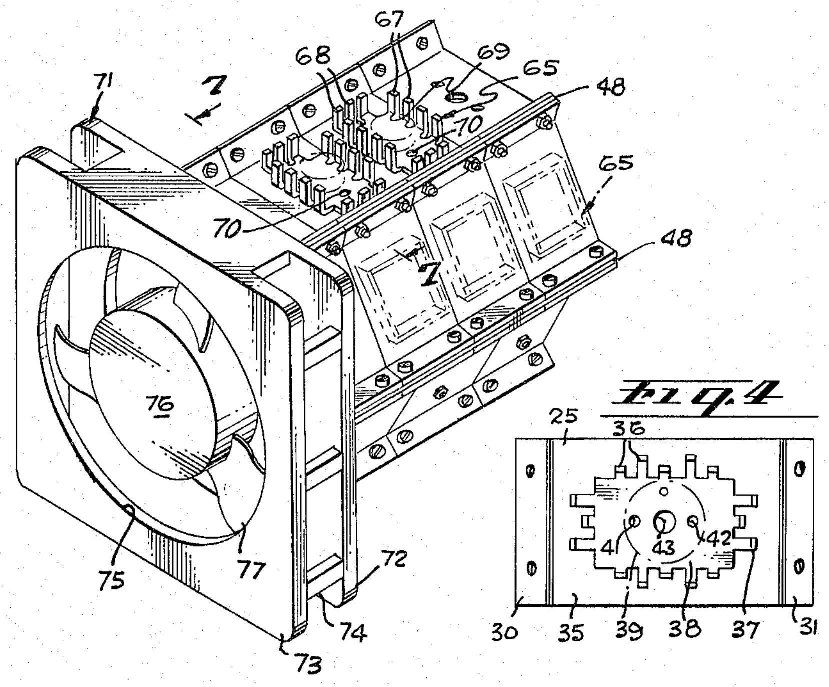
FIGURE 4 is a plan view of the device of FIGURE 3.
FIGURE 6 is a side perspective view of another form of the invention.

On an inside face 35 of each unit there is provided a series of fingers comprising coolers, here shown as consisting of relatively long fingers 36 adjacent the side edges 26 and 27 and relatively short fingers 37 adjacent the end edges 28 and 29. These fingers may be staggered with relationship to each other or in line, as the case may be, depending upon the degree of turbulence desired and other factors relating to the degree of heat dissipation by radiation as well as convection. The long and short fingers may be arranged in any perimetral pattern, there being employed a rectangular pattern, as shown in FIGURE 4, whereby the fingers provide an enclosure 38 within which may be mounted an electronic component such as a transistor 39 suggested by the broken lines in FIGURE 4.

Although long and short fingers have been herein described, the fingers may all be of the same length as the short fingers 37. Where increased radiation effect in particular is desired, long fingers are employed along the side edges extending for an arbitrary distance into a chamber 40 in the housing 11. The short fingers are made short enough so that they can approach immediately adjacent shortened fingers to the greatest degree possible but without actually touching the next adjacent short fingers as shown to good advantage in FIGURE 2.

Sundry holes 41, 42, 43 and 44 are provided in the base plate 25 for various facilities as, for example, mounting bolts 45 and 46 of an appropriate transistor and for a lead cable 47.

Figure 5:
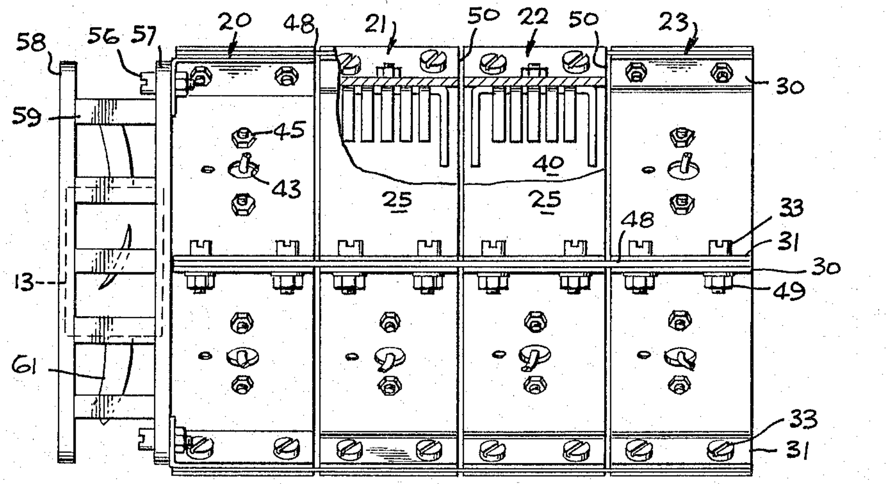
FIGURE 5 is a side elvational view of the device of FIGURE 1.

In order to assemble the units into a module like the module 22, six such units are selected and arranged in a hexagonal relationship, as shown in FIGURE 2. The same assembly is also made, each in turn of six units, to form the modules 20, 21 and 23. In this particular embodiment the modules are not in fact assembled separately but rather are fastened to form the cooler housing 11 as an over-all assembly. This is facilitated by the employment of insulating strips 48 of a relatively heavy gage dielectric material such as is an appropriate commercial synthetic plastic resin which provides structural strength and rigidity as well as insulating capacity. In the chosen embodiment the flanges 30 and 31 of one unit are fastened to respectively adjacent flanges 31 and 30 of the next adjacent unit by use of the screws 33 extending through appropriate holes in the flanges and in the insulating strips whereupon they are secured by appropriate nuts 49. By this simple expedient of bolting six separate units together, separated only by the insulating strips, the hexagonal module of each successive set is assembled in side to side relationship. This relationship may be such as to have the side edges in engagement with each other or to provide spaces 50 therebetween, as shown in FIGURE 5. With all of the parts fastened together and assembled as shown, the cooler housing is therefore made up with its walls actually consisting of the respective base plates 25 which are simultaneously base plates of the individual units and also walls of the composite structure.

Although the fingers may be constructed in various ways from metal such as the metal of the base plate or from metal of some different type, by way of illustration the fingers of the illustrative embodiment consist of a sheet 51 of metal from which the fingers are cut out and bent inwardly in the form already made reference to. Captive ends of the fingers fasten in angular relationship to the sheet 51 and free ends of the fingers extend inwardly into the chamber 40. It is of consequence to note that in this particular embodiment of the invention wherein a hexagonal shape is employed, the fingers 36 and 37 of each unit are at an acute angle with respect to the fingers of the next adjacent unit on both sides. This same desirable circumstance would hold true to an equal degree where the housing might be made of any one of a number of other shapes such as a triangular, square or pentagonal shape, only the angularity of disposition being different. This is important in that heat radiated from fingers of any one of the units will not be reflected directly back from fingers of the units immediately adjacent thereto where the greatest amount of heat is felt. In the chosen embodiment the angular relationship which prevails among virtually all of the fingers thereby assures to a still further degree against reflection of radiant heat from one unit to another. Moreover, a housing constructed in the fashion shown and described forms a cooler package of considerable value when depending upon natural circulation of air to create flow by convection through and around the housing. Should the housing be stood on end, the convection currents generated by the heating of the components within the housing will supply circulation of air for cooling purposes. The circulation is rendered considerably turbulent by the interposition of the various fingers in their different locations as shown and described.

Where a still more pronounced cooling effect is desired, the fan 13 may be employed. By way of example, for mounting the fan housing 12 there are provided brackets 55 by means of which the fan housing is attached to the cooler housing by employment of suitable screws 56. The fan housing here employed consists of inside and outside plates 57 and 58, respectively, held in spaced relationship by means of spreaders 59. The fan may be any one of a number of acceptable commercial types of fans, one which is particularly advantageous comprising a structure wherein a motor housing 60 is suspended in a spider-like structure (not shown) at the axial center line of the fan housing and cooler housing with blades 61 located at the periphery so that an air stream generated by rotation of the fan is concentrated to a greater degree at the periphery or, in other words, near the inside faces of the walls of the polygonal housing. This is of consequence because the fingers are concentrated near the walls, leaving the central area open. Moreover, because of the openness of the construction, that is to say, clear open in the center and partially obstructed by the interposition of the fingers along the sides, very little back pressure is built up in cooling the device but at the same time a considerable turbulence is created which assists to an appreciable degree the effective and rapid dissipation of heat collected by the fingers from the transistors or other components which may be mounted in the structure. The degree of cooling may also be varied very simply by speeding up or slowing down the speed of operation of the fan or, if need be, by employing a pusher type fan at one end as shown and by applying to the opposite end a puller type fan (not shown) but following substantially conventional mounting and operating practices.

Moreover, by providing units constructed individually as shown and described and mounted together in the fashion shown, the lead cables can be very conveniently and effectively passed into the exterior and then drawn together into composite cables in any direction which might be convenient without in any manner interfering with the effective dissipation of heat by circulation of air, either natural or forced, or by radiation or, in fact, conduction through the base plates to the exterior.

Figure 7:
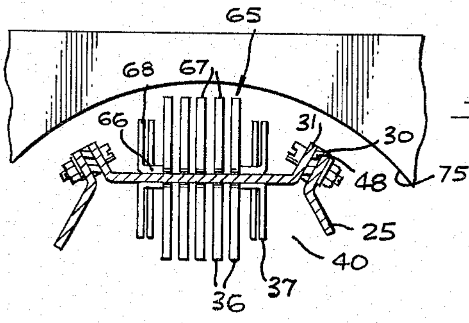
FIGURE 7 is a fragmentary cross-sectional view taken on the line 7—7 of FIGURE 6.

To still further enhance the multiple effect of the package, coolers in the form of units 65 may be mounted on outside surfaces of the base plates, as shown in FIGURES 6 and 7. These cooler units may be constructed in various fashions but a simple and effective unit may be provided by employment of a sheet 66 of appropriate metal from which are bent long fingers 67 at the side edges and short fingers 68 at end edges. Again it will be understood that the fingers may be of the same length, either the length of the short fingers or the length of the long fingers, and may be staggered or located in straight lines, the object in the main being to provide an enclosure for accommodating a suitable component such as a transistor 69. Cooler units 65 may be located on one or a few of the units 25 initially making up the housing or, if desired, may be located upon all of the units 25. In the last example lead cables may be drawn through secondary holes 70 extending entirely through both sheets and the base plate.

In the last described form of the invention of FIGURES 6 and 7 a fan housing 71 may be made large enough so as to extend well outside of the cooler housing 11. The same general structure of fan housing may be employed consisting of inner and outer plates 72 and 73, respectively, held apart by suitable spreaders 74 to provide a space therebetween through which some of the air moved by the fan may pass. A separately located hole 75 of course provides for passage of most of the air moved. Here again the fan motor housing 76 may be centrally mounted in a position to effect rotation of blades 77 at the periphery. The arc of rotation of these blades is preferably one such that the air moved by the blades is in line with the walls of the housing, passing partly over the inner walls and partly over the outer walls so that there is circulation over all of the units.

Although a very substantial cooling effect may be obtained from the large size fan of FIGURE 6, especially where the hole 75 through which air passes is large enough to encompass both the exterior and the interior cooler unit, some occasions may require a more varied heating performance. On such an occasion a fan housing like the housing 12 may be employed even though cooler units are employed on the outside as well as on the inside. Under such circumstances there will be a greater degree of cooling for the inside units and a lesser degree of cooling for the outside units. This, however, may be desirable where different performance requirements exist for various of the components.

Also of marked advantage for the forced air cooler type rather than those which depend upon natural circulation of air is the fact that the packages may be mounted in any attitude, either vertically, horizontally, or at any angle. Further also, packages may be mounted side by side in quarters which are considerably cramped and which thereby makes possible the concentration of a great many electronic components in a small space which, however, will permit performance of all of them under amply cooled conditions.

Further still, by making a composite package such that structurally it can be built of the individual units, inventory of parts can be held substantially to a minimum, the parts, however, being such that they can be built up in smaller or larger numbers to construct cooler packages of virtually any desired capacity. Moreover, module sections may be made in advance and stacked one alongside the other as desired, depending upon the needs of a particular installation. Further still, modules can be removed under such circumstances as require packages of lesser capacity. The only tools needed for this assembly and disassembly consists of a wrench and screwdriver.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A cooler package for electronic components comprising a housing having a plurality of side walls forming a chamber of polygonal cross-sectional shape and having a longitudinal axis, a set of coolers comprising a plurality of individual cooler units for said components, each said unit comprising separate individual fingers spaced from each other in both axial and circumfernetial directions, said fingers having captive ends attached to a portion of one of said walls and opposite free ends, means for mounting a component in each unit adjacent the fingers, the fingers of units adjacent each other in the same cross-sectional plane having fingers angularly disposed relative to the fingers of the next adjacent units.

2. A cooler package for electronic components comprising a housing having a plurality of side walls forming a chamber of polygonal cross-sectional shape and having a central axis parallel to the side walls, said walls comprising individual units arranged in a perimetral sequence and means holding adjacent side edges of adjacent units in engagement with each other, a set of coolers comprising a plurality of individual cooler units for said components, each said unit comprising a fence of individual axially spaced fingers having captive ends attached to a portion of one of said walls and opposite free ends, said fingers of each of said units being in a group forming an enclosure for reception of the respective component, units adjacent each other in the same cross-sectional plane having fingers angularly disposed relative to the fingers of the next adjacent units.

3. A cooler package for electronic components comprising a housing having a plurality of side walls forming a chamber of polygonal cross-sectional shape, said walls comprising individual units arranged in a perimetral sequence and means holding adjacent side edges of adjacent units in engagament with each other, a first set of coolers comprising a plurality of individual cooler units for said components extending around the periphery of said chamber and forming a module and a second set of said coolers extending around the periphery of said chamber and forming a second module, said second module being in a plane parallel to said first module, and means securing said modules together in said parallel relationship, each said unit comprising a fence of axially and radially separated fingers having captive ends attached to a portion of one of said walls and poposite free ends, said fingers being in a perimetrally extending group forming an enclosure for reception of the respective component, the finger of units adjacent each other in the same module being angularly disposed relative to the fingers of the next adjacent units.

4. A cooler package for electronic components comprising a housing having an odd number of side walls numbering at least three forming a chamber of polygonal cross-sectional shape, said walls comprising separate identical individual units and means holding adjacent side edges of adjacent units in engagement with each other, a set of coolers comprising a plurality of individual cooler units for said components, each said unit comprising a fence of fingers having captive ends attached to a portion of one of said walls and opposite free ends, the captive ends of said fingers being in a group forming an enclosure for reception of the respective component and the free ends extending outwardly away from the enclosure in open fashion providing access to said enclosure, the fingers of units adjacent each other in the same cross-sectional plane being angularly disposed relative to the fingers of the next adjacent units at angles less than right angles whereby to inhibit reflection of heat back and forth, said walls having holes therethrough at the location of said units adapted to accommodate respectively lead wires and mounting means for the respective components.

5. A cooler package for electronic components comprising a housing having a plurality of side walls forming a chamber of polyganol cross-sectional shape and with openings at opposite ends, and a set of coolers comprising a plurality of individual separate cooler units for said components, each said unit comprising a fence of fingers having captive ends attached to a portion of one of said walls and having opposite free ends, the captive ends of said fingers being in a group forming an enclosure for reception of the respective component and the free ends extending outwardly away from the enclosure in open fashion providing access to said enclosure, the fingers of units adjacent each other in the same cross-sectional plane being angularly disposed relative to the fingers of the next adjacent units at angles of less than a right angle whereby to inhibit reflection of heat back and forth a blower mounted on the housing at one end, flow directing means extending from the fan to a location around said set of units whereby to direct air from the blower past the fingers.

6. A cooler package for electronic components comprising a housing having a plurality of side walls forming a chamber of polyganol cross-sectional shape and with openings at opposite ends, said walls comprising individual units and means holding adjacent side edges of adjacent units in engagement with each other, a first set of coolers comprising a plurality of individual cooler units for said components mounted on the walls around the perimeter of said chamber and a second set of said coolers mounted on the walls around the perimeter of said chamber and in parallel adjacent position with respect to said first set, each said unit comprising a fence of fingers having captive ends attached to a portion of one of said walls and opposite free ends, said fingers being in a group forming an enclosure for reception of the respective component, the fingers of units adjacent each other in the same cross-sectional plane being angularly disposed relative to the fingers of the next adjacent units, a blower mounted on the housing at one end, flow directing means extending from the fan to a location around the perimeter of said sets of units whereby to direct air from the blower past the fingers of both said sets of units.

7. A cooler package for electronic components comprising a housing having a plurality of side walls forming a chamber of polyganol cross-sectional shape and with openings at opposite ends, said walls comprising individual units and means holding adjacent side edges of adjacent units in engagement with each other, and a first set of coolers comprising a plurality of individual cooler units for said components, each said unit comprising a fence of fingers having captive ends attached to a portion of one of said walls and opposite free ends extending radially inwardly, said fingers being in a group forming an enclosure for reception of the respective component, the fingers of units adjacent each other in the same cross-sectional plane being angularly disposed relative to the fingers of the next adjacent units, a second set of said coolers comprising a plurality of individual units for said components in back to back relationship on said walls with respect to units of said first set and with fingers extending radially outwardly, a blower mounted on the housing in the opening at one end, flow directing means extending from the fan to a location around at least some of said units whereby to direct air from the blower past the fingers.

8. A cooler package for electronic components comprising a housing having a plurality of side walls forming a chamber of polygonal cross-sectional shape and with openings at opposite ends, said walls comprising individual units and means holding adjacent side edges of adjacent units in engagement with each other, a first set of coolers comprising a plurality of individual cooler units for said components, each said unit comprising a fence of fingers having captive ends attached to a portion of one of said walls and having opposite free ends, said fingers being in a group forming an enclosure for reception of the respective component, the fingers of units adjacent each other in the same cross-sectional plane being angularly disposed relative to the fingers of the next adjacent units, a second set of coolers comprising a plurality of individual units for said components in back to back relationship on said walls with respect to units of said first set, a blower mounted on the housing in the opening at one end, and flow directing means extending from the fan to a location around the perimeter of said second set of units whereby to direct air from the blower past the fingers of both said sets of units.

9. A cooler package for electronic components comprising a plurality of separate individual cooler units, each said unit comprising a base plate having a pair of opposite parallel side edges and a pair of opposite parallel end edges, a plurality of fingers having captive ends secured to the base plate and having opposite free ends, said fingers forming an enclosure for reception of a component, and a housing comprising a plurality of said units joined together at said end edges in the form of a polygonal housing.

10. A cooler for a plurality of electronic components comprising a modular structure of individual cooler unit members, each member comprising a plate, a plurality of spaced separate fingers on the plate, captive ends of said fingers being secured to the plate in the form of an enclosure for an electronic component and free ends of said fingers extending outwardly away from the plate in open fashion, opposite parallel ends of each said plate comprising flanges disposed at an angle relative to the base, and fastening means in engagement with adjacent flanges of adjacent cooler unit members whereby the unit members form a perimetral structure with an open central passageway for circulation of cooling air therethrough and through spaces between the fingers to said enclosures.

11. A cooler package for electronic components comprising a plurality of separate individual cooler units, each said unit comprising a base plate having a pair of opposite parallel side edges and a pair of opposite parallel end edges, said end edges comprising flanges each bent at an angle relative to the base plate, a plurality of fingers having captive ends secured to the base plate and having opposite free ends, said fingers being arranged around a perimeter forming a closure for reception of a component, and holes through said base plate adapted to accommodate leads and fastening means for said component, and a housing comprising a plurality of sets of said units, each set comprising a plurality of units joined together at said flanges in the form of a polygonal housing section with open ends, a plurality of said sections being joined together at side edges of the respective units whereby to form said housing of multiple sections from the individual units.

12. A cooler package for electronic components comprising a plurality of separate individual cooler units, each said unit comprising a base plate having a pair of opposite parallel side edges and a pair of opposite parallel end edges, said end edges comprising flanges each bent at an angle relative to the base plate, a plurality of fingers having captive ends secured to the base plate and having opposite free ends, said fingers being arranged around a perimeter forming an enclosure open at one side for reception of a component, fingers adjacent said end edges being shorter than fingers adjacent said side edges, said base plate having holes therethrough adapted to accommodate leads and fastening means for the respective component, and a housing comprising a plurality of sets of said units, each set comprising a plurality of units joined together at said flanges in the form of a polygonal housing section with open ends, and a strip of insulating material spacing and separating adjacent flanges from each other, a plurality of said sections being joined together at side edges of the respective units whereby to form said housing from multiple sections of individual units in a form having open opposite ends for circulation of a cooling medium therethrough.

References Cited by the Examiner

UNITED STATES PATENTS

| | | | |
|---|---|---|---|
| 2,730,663 | 1/1956 | Harty | 317—234 |
| 2,998,962 | 9/1961 | Heyn | 165—154 |
| 2,999,971 | 9/1961 | Schnecke | 321—27 |
| 3,004,196 | 10/1961 | Drexel | 317—234 |
| 3,149,666 | 9/1964 | Coe | 165—121 |

FOREIGN PATENTS

| | | |
|---|---|---|
| 768,103 | 2/1957 | Great Britain. |

ROBERT K. SCHAEFER, *Primary Examiner.*

JOHN F. BURNS, KATHLEEN H. CLAFFY, *Examiners.*

J. G. COBB, H. J. RICHMAN, M. GINSBERG, *Assistant Examiners.*